United States Patent Office 3,608,447
Patented Sept. 28, 1971

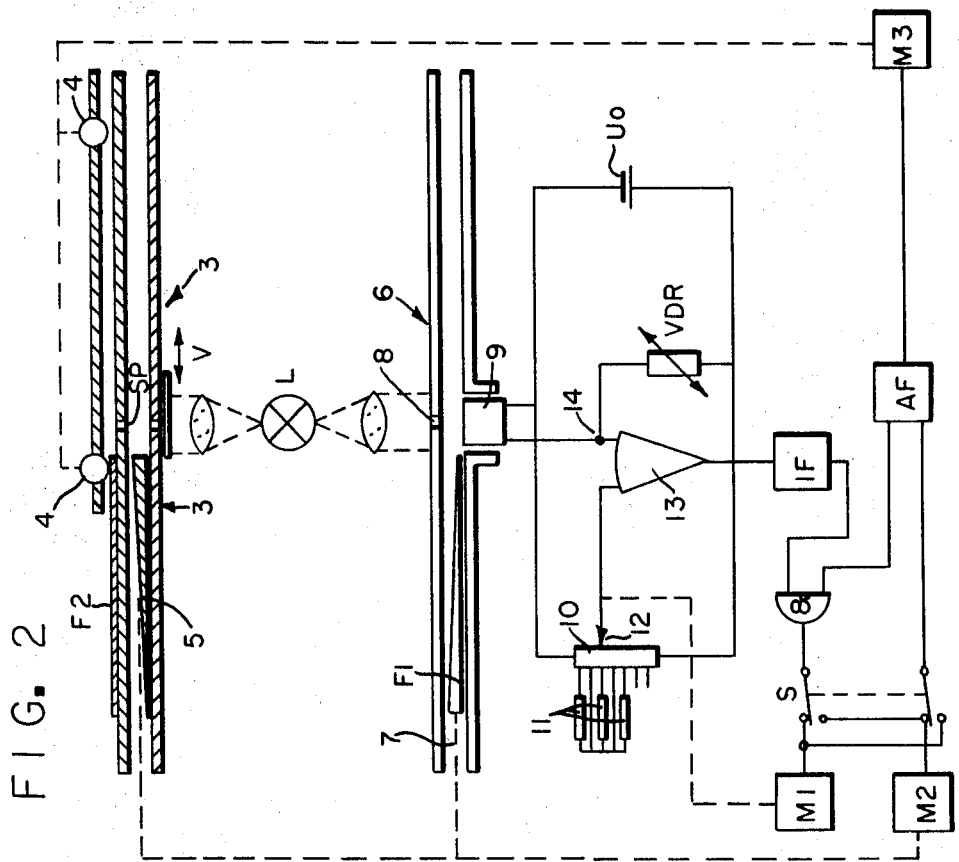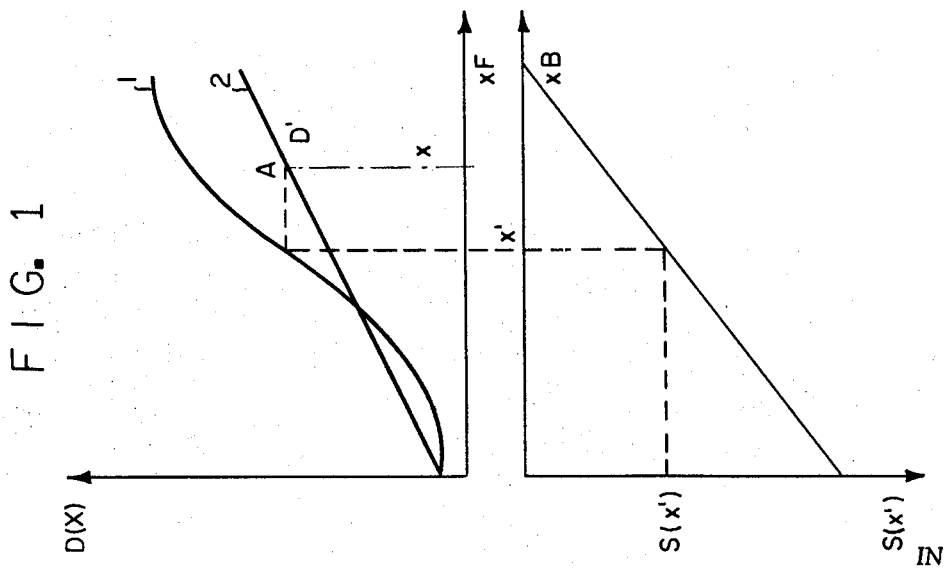

3,608,447
APPARATUS AND PROCESS FOR PRODUCING PHOTOGRAPHIC DENSITY WEDGES
Karl-Heinz Furst, Gotzenhain, Germany, assignor to E. I. du Pont de Nemours and Company, Wilmington, Del.
Filed Dec. 10, 1969, Ser. No. 883,790
Claims priority, application Germany, Dec. 19, 1968,
P 18 15 583.4
Int. Cl. G03
U.S. Cl. 95—1                                    4 Claims

ABSTRACT OF THE DISCLOSURE

Apparatus and process for producing photographic density wedges by illumination of a film strip through an exposure wedge which is moved with the strip past an illumination slit and a densitometer with a linearization component. In one switch position, the wedge and strip are moved in synchronism with constant velocity, and in a second position only the strip moves at such velocity past the slit, and the position of the exposure wedge in front of the slit and the densitometer is controlled in accordance with the density produced on the first exposed sample.

---

The invention relates to a process and an apparatus for producing photographic density wedges by illumination of a film strip through an exposure wedge.

Since density wedges are customarily used in optical precision equipment, it is of fundamental importance to their usefulness and their quality that the density pattern $D(x)$ corresponds exactly to the desired wedge function which in general is an exact linear function.

If one illuminates a film material through an existing density wedge, one obtains after developing the film not a complementary density pattern but a density pattern which has been modified in accordance with the characteristics of the film material and which does not bear a linear relationship to the density pattern of the original density wedge which was used as the exposure wedge.

It is therefore the object of this invention to provide a process and an apparatus by means of which it becomes possible to produce density wedges with the desired density pattern $D(x)$ by exposure of the film material through an exposure wedge.

This problem is solved according to the invention in that one first exposes a sample of the same photographic material from which the density wedge is to be made, synchronously with the exposure wedge used while maintaining uniform exposure times, over the entire length of the sample, and that one then exposes the photographic film material, while retaining the same exposure time, through the same exposure wedge, and that one thereby positions the exposure wedge, in accordance with the local degree of density measured on the sample after developing, in order to produce a desired local degree of density, in front of the location of the film material to be exposed, with that zone by means of which the desired local degree of density had been produced before on the sample. In the process according to the invention, care is taken that for each desired local density D; the film is exposed through the density $S(x')$ of the exposure wedge at which by means of the prior sample exposure exactly this desired density D' had been produced.

The process according to the invention can be carried out particularly effectively by means of an apparatus which consists in essence of the combination of a sensitometer and a densitometer. According to the present invention, this apparatus is characterized in that sensitometer with devices for moving an exposure wedge and a first film strip to be exposed past an illumination slit and a densitometer with a linearization component (a reference element) in the indicating element are coupled together in such a fashion that in one switch position the exposure wedge and the first film strip to be exposed are moved synchronously and with constant speed past the illumination slit, whereas in the second switch position only the second film strip to be exposed is moved with constant speed past the illumination slit (SP). The position of the exposure wedge (B) in front of the slit (SP) is then regulated by the densitometer in accordance with the density produced on the previously exposed first sample film strip (F1). It is particularly advantageous for the apparatus according to the invention if the linearization component of the indicator of the densitometer is driven, in the second switch position, with a velocity which corresponds to the desired characteristic of the density wedge to be produced, for example a constant velocity, and if the exposure wedge in the sensitometer is driven by the correcting element of the equalization device of the indicating instrument of the densitometer. The linearization component of the indicator of the densitometer can preferably be a function potentiometer which is connected with the sensor of the densitometer in a bridge circuit.

In a particularly advantageous embodiment of the invention, three essentially equal stepping motors may be provided for the conveyance of the film strip to be exposed and the exposure wedge and for adjusting the linearization component, of which motors the motor for conveying the film strip to be exposed is connected permanently to an impulse generator, whereas the motor for the synchronous advance of the exposure wedge in the sensitometer and the sample in the densitometer are driven directly via a selector switch in the first switch position, and in the second switch position are driven by the impulse generator via an and-gate controlled by the bridge and finally the servomotor of the linearization component is driven via the selector switch in the first switch position via the and-gate and in the second switch position is driven directly by the impulse generator.

An example of the invention is further explained below by means of the drawing wherein:

FIG. 1 is a schematic representation of the process according to the invention, and FIG. 2 is a block diagram of an example of the apparatus according to the invention.

In carrying out the invention, a film sample F2 is, for example, first exposed in a combined sensitometer and densitometer shown in FIG. 2 synchronously by means of a light source L and illumination slit SP through an exposure wedge B. This film sample F2 is developed and then possesses a density pattern $D(x)$ which does not bear a linear relationship to the density pattern $S(x)$ of the exposure wedge B. An example of a density curve is shown at 1 in the upper portion of FIG. 1. As shown by curve 1, the density pattern is largely determined by the characteristics of the film.

According to the process of this invention, the new density wedge or a series of density wedges are produced from the same material as sample F2. Furthermore, the desired density pattern curve 2 for the density wedge to be produced is first established. The film material for the new density wedge is again introduced into the sensitometer 3 and is conducted by means of a suitable conveyor device, for example conveyor rolls 4, with constant velocity through the sensitometer 3 and is thereby exposed, after the shutter V is opened.

In order to arrange for the suitable actual exposure for the density wedge at all locations of the film material F2, one proceeds in the manner as shown in FIG. 1 for the example of location A indicated by means of the longitudinal coordinate X, as follows:

First, one determines the coordinate $x'$ where the density $D'$ is the same as the density which is desired for location A with coordinate X of the new density wedge. Since sample F1 is conducted synchronously with the exposure wedge B through the sensitometer 3, the density wedge B is located in front of the slit SP with that location which also has the coordinate $x'$. Since the brightness of the lamp L is kept constant during the entire production process, the film F2 receives at the location A an exposure through the density $S(x')$, which previously produced on sample F1 the density $D'$ at the location $x'$.

FIG. 2 shows an example of possible apparatus for carrying out this process. For this purpose, a sensitometer 3 is provided which comprises devices 5 for conveying an exposure wedge B and devices, for example, conveyor rolls 4 for conveying a film strip F1 or F2 to be exposed past an illumination slit SP.

A densitometer 6 is coupled with the sensitometer 3 in the following mannner:

The advancing device 7 present in the densitometer for the exposed film sample F1 is coupled directly with the advancing device 5 for the exposure wedge B in sensitometer 3 so that the film sample F1 must move synchronously with the exposure wedge B if it has been inserted correctly into the adjusting device 7. The two adjusting devices 5 and 7 are driven by a common stepping motor M2. The film advance of sensitometer 3 is driven by a stepping motor M3 which is controlled by a pulse generator AF contained in the equalization and indicator device of sensitometer 6. Furthermore, in the example given, the sensitometer 3 and the densitometer 6 have the same light source. For densitometer 6, light source L works on an illumination slit 8 which is located opposite from the photoelectric sensor of the sensitometer.

In the example shown, the indicator and equalization device of the densitometer 6 contains the bridge circuit of a photoconductive cell 21 which is used as sensor, a Varistor resistor VDR, a function potentiometer 10 with parallel resistors 11 and a current source $U_o$. In the example of FIG. 2, the equalization device contains an operational amplifier 13. In the present example, the operational amplifier 13 is used for comparing the signal present at the pick-off 12 with the measuring signal present at point 14 between the photoconductive cell 9 and the Varistor resistor VDR. A pulse shaper IF is connected with the operational amplifier 13. An and-gate & is connected to the pulse shaper IF. The and-gate & is connected with its second input to the pulse generator AF mentioned above, and is connected with its output to the selector switch S. To the second contact bank of the selector switch S, a third output of the pulse generator AF is connected. To the selector switch S are connected the already mentioned stepping motor M2 for driving the adjusting device 5 for the exposure wedge B in the sensitometer 3 and the driving mechanism for the adjusting device 7 for the sample F1 in the sensitometer 6. Furthermore, stepping motor M1 which serves to adjust the pick-off 12 of the function potentiometer 10 is also connected to selector switch S. The arrangement is such that in the one switch position of selector switch S the stepping motor M1 which is used for adjusting the function potentiometer 10 is connected with the output of the and-gate &, whereas the stepping motor M2 which is used for the drive mechanisms 5 and 7 is connected with the pulse generator AF. In the second switch position, stepping motor M1 is connected with the impulse generator AF, and stepping motor M2 is connected with the output of the and-gate &.

In order to carry out the process described above, the selector switch S is first placed in that switch position in which stepping motor M2 used for driving the adjusting devices 5 and 7 is connected with pulse generator AF and stepping motor M1 for adjusting the pick-off 12 of the function potentiometer 10 is connected to the output of the and gate &. Then, the first film sample F1 is placed in the still unexposed state in the conveyor device, that is on transport rolls 4 of sensitometer 3. By means of stepping motors M2 and M3, film sample F2 and exposure wedge B are conducted synchronously through the sensitometer 3. Film sample F1 is then developed so that it possesses the density characteristics represented by curve 1 in FIG. 1. After returning the adjusting devices 5 and 7 of sensitometer 3 and of densitometer 6, the developed film sample F1 is then placed in the adjusting device 7 of densitometer 6. A new film strip F2 consisting of the same film material as the sample is then placed on the transport rolls 4 of sensitometer 3. After resetting of the pick-off 12 of the function potentiometer 10 to the zero position, the selector switch S is then put in that switch position in which stepping motor M2 for the adjusting devices 5 and 7 is connected with the output of the and-gate &, whereas stepping motor M1 for the pick-off 2 of the potentiometer 10 is connected with pulse generator AF. When the combined apparatus with these preadjustments is moved along, the film strip F2 is advanced by one step by stepping motor M3 for each pulse produced by pulse generator AF. Similarly, the pick-off 12 of the function potentiometer 10 is advanced by one step with each pulse produced by pulse generator AF. At the function potentiometer, the desired characteristic for the density wedge to be produced is first established as for example represented by the straight line 2 in the upper portion of FIG. 1, by adjusting the parallel resistors 11. In this manner, the stepping motors M1 and M2 adjust, under direct control of pulse generator AF, synchronously the X coordinates at film strip F2 and at the function potentiometer 10. In this manner, the corresponding point A with density $D'$ of the desired density curve is determined at the function potentiometer 10 for each location X of film strip F2, and a corresponding electrical voltage signal is sent to the bridge circuit. The equalization of the bridge circuit is then brought about by shifting the film sample F1 by means of adjusting device 7 in front of sensor 9 until the equalization of the bridge has taken place. For this purpose, the operational amplifier 13 and the pulse shaper IF produce for each adjustment of the pick-off 12 an I-signal at the one input of the and-gate &, until sample F1 has been suitably adjusted. The and-gate thus passes the I-signals from pulse generator AF via the selector switch S to stepping motor M2, so that the latter advances both the sample F1 and the exposure wedge B stepwise, until that location of sample F1 is in front of sensor 9 which possesses density $D'$ and accordingly corresponds to bridge equalization. Once the bridge equalization has taken place, the operation amplifier 13 and the pulse shaper IF give an O-signal to the one input of the and-gate &, so that the latter is closed for the I-signals coming from pulse generator AF. As already stated, the fundamental characteristic of the density wedge to be produced can be established by adjustment of the parallel resistors 11 of the function potentiometer 10. By skillful use of pulse reducers or mechanical drive units virtually any desired wedge constant can be achieved. According to the same principle, one can also produce step wedges with step constants and step widths which are adjustable within wide limits. For this purpose, the film conveyor is first inserted into the sensitometer, whereby the shutter V is closed. The function potentiometer 10 is adjusted by means of a preselected number of pulses which is proportional to the step constant, and is then stopped. The bridge is again equalized, and thereby the film sample F1 and the exposure wedge B are correspondingly adjusted. Then, a preselected number of stepwise advances of film strip F2 is carried out with constant velocity and with the shutter open. It is particularly advantageous within the framework of the invention if the function potentiometer 10 with its parallel resistors 11 is fitted as a digital linearization component, for example in such a fashion that each stepwise adjustment of the pick-off 12 corresponds to one tenth of a density unit.

Instead of the bridge circuit with function potentiometer 10 shown in the example given, one may also use equalization devices of the type of electronic follow-up or programming systems with a function generator in the densitometer 6, and they may be used for controlling adjusting devices 5 and 7 in the sensitometer 3 and the densitometer 6.

The embodiments of the invention in which an exclusive property or privilege is claimed are defined as follows:

1. An apparatus for producing photographic density wedges comprising in combination:
    (1) a device for moving a sample photographic film strip to be exposed, and
    (2) an exposure wedge past,
    (3) an illumination slit of
    (4) a sensitometer to form an exposed film strip which upon development forms a reference density wedge in said strip,
    (5) an illumination slit of
    (6) a densitometer having
        (a) an indicator device with
        (b) a linearization component; said densitometer indicator device and component being connected through an electrical circuit having
    (7) a selector switch; said apparatus being adapted so that in exposing the film strip in a first switch position to produce a reference density wedge, the sample film strip and density wedge are moved past slit (3) with constant velocity and in exposing additional photographic film strips through the reference density wedge and illumination slit (5) in a second switch position, the position of the exposure wedge (2) is controlled in accordance with the density produced on the first exposed sample.

2. Apparatus according to claim 1, characterized in that the linearization component (b) of the indicator (a) of the densitometer (6) when connected through the second switch position allows the film strip to be moved at a velocity corresponding to the characteristic of the reference density wedge, and that the exposure wedge (2) is moved synchronously with the sample film strip past the slit of the densitometer (6) by means of a correcting element of a balancing and indicating device of the densitometer (6).

3. Apparatus according to claim 2, characterized in that the linearization component of the balancing and indicating device of densitometer (6) is a functional potentiometer connected with a sensor of a bridge circuit.

4. Apparatus according to claim 2, characterized in that for the conveyance of a second film strip to be exposed, of the exposure wedge and of the first sample film strip and for the adjustment of the linearization component three essentially equal stepping motors are provided, of which the motor for the conveyance of the second film strip to be exposed is permanently connected with an impulse generator, whereas the motor for the synchronous advance of the exposure wedge in the sensitometer and the sample in the densitometer is driven directly by selector switch in the first switch position, and in the second switch position is driven via an and-gate controlled by the bridge, by the impulse generator, and finally a servomotor of the linearization component is driven via the selector switch in the first switch position via the and-gate and in the second switch position is driven directly by the impulse generator.

References Cited

UNITED STATES PATENTS

| | | | |
|---|---|---|---|
| 2,603,133 | 7/1952 | Strong | 95—1 |
| 2,960,015 | 11/1960 | Rodine | 95—1 |

SAMUEL S. MATTHEWS, Primary Examiner

D. J. CLEMENT, Assistant Examiner

U.S. Cl. X.R.

96—27